March 20, 1962  D. W. QUIRK  3,026,393
BASEBOARD WIRING DEVICE PROVIDED WITH COMBINATION
THERMOSTATIC SWITCH AND MANUAL PUSHBUTTON
SWITCH TEMPERATURE CONTROL SYSTEM
Filed April 22, 1959  3 Sheets-Sheet 1
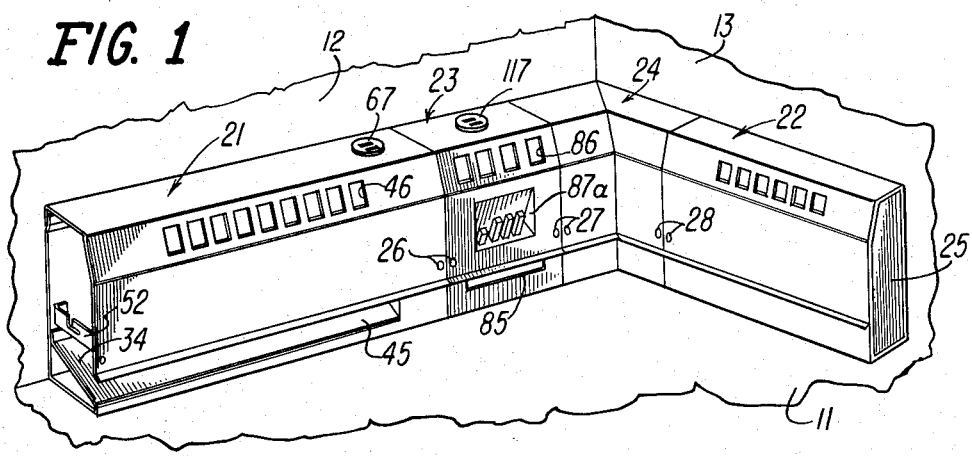
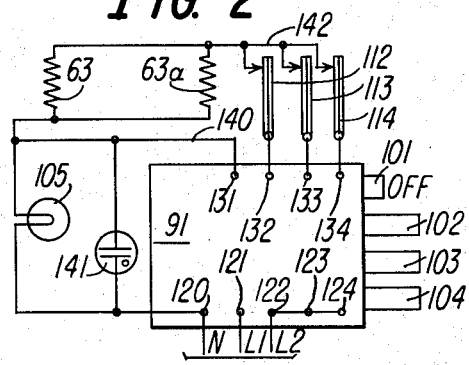
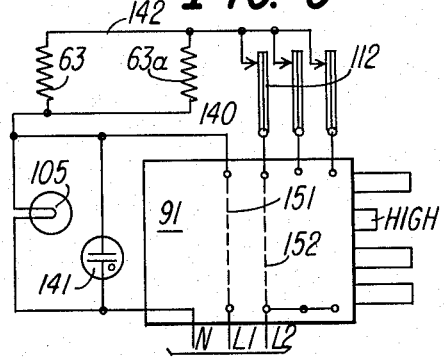
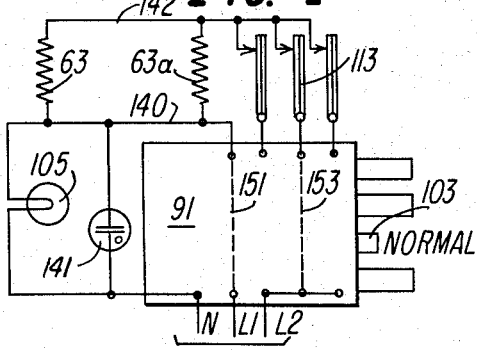
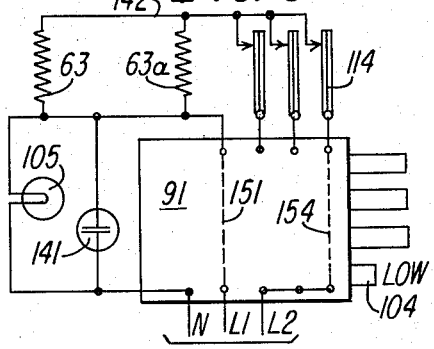
INVENTOR.
Douglas W. Quirk.
BY
Prangley, Baird, Clayton, Miller & Vogel
Attys.

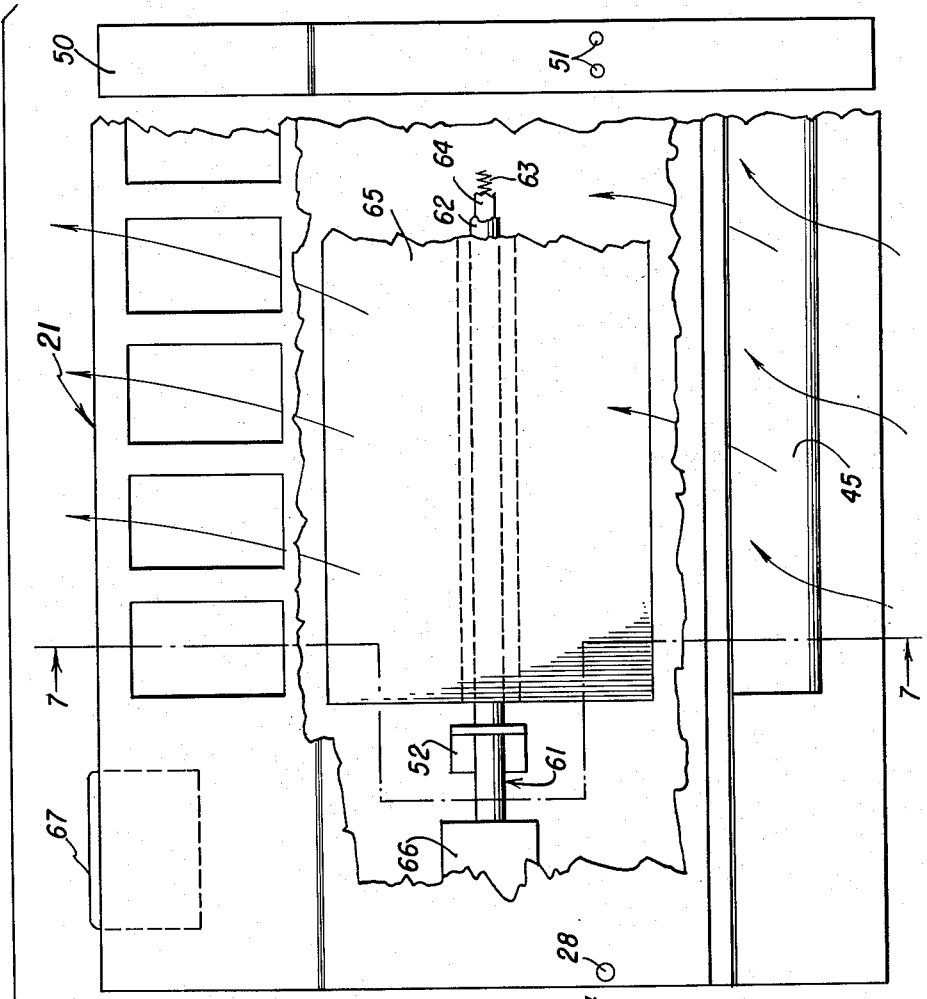
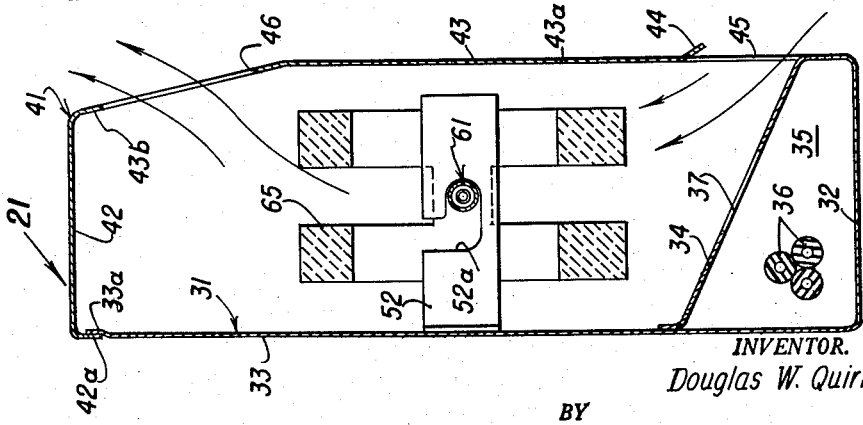

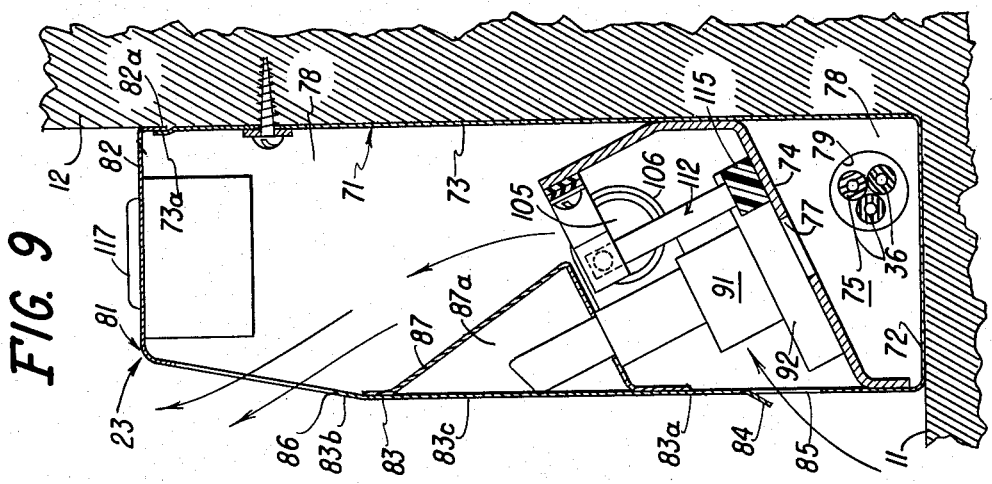
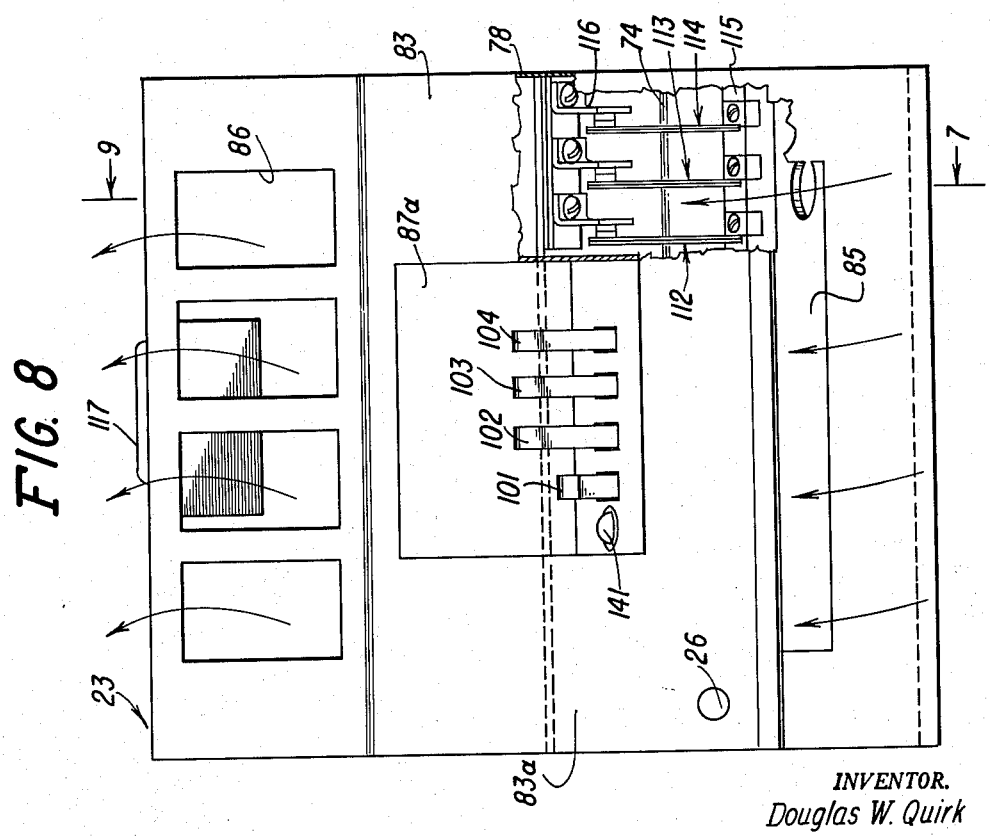

United States Patent Office 3,026,393
Patented Mar. 20, 1962

3,026,393
BASEBOARD WIRING DEVICE PROVIDED WITH COMBINATION THERMOSTATIC SWITCH AND MANUAL PUSHBUTTON SWITCH TEMPERATURE CONTROL SYSTEM
Douglas W. Quirk, Deerfield, Ill., assignor to General Electric Company, a corporation of New York
Filed Apr. 22, 1959, Ser. No. 808,137
1 Claim. (Cl. 200—138)

The present invention relates to baseboard electric heating systems and wiring devices therefor, and more particularly to such systems and devices that are especially designed for home use.

It is a general object of the invention to provide a baseboard heating system that may be installed in the room of an existing home in a ready and simple manner, without modification of the walls of the room.

Another object of the invention is to provide in a baseboard electric heating system, an improved control arrangement including a casing arranged directly in a section of the baseboard and forming a part of the structure thereof and housing manually-settable thermostatically-controlled switching apparatus for selectively governing the energization of the electric heating units housed in the baseboard structure.

A further object of the invention is to provide in a baseboard electric heating system, an improved control arrangement therefor and including a casing accommodating the circulation of air therethrough and housing both a plurality of thermostatic switches and a manually operable multi-position selector switch, wherein the thermostatic switches are progressively set to respond to progressive temperatures in the general range extending from about 55° F. to about 85° F. and the selector switch is readily accessible from the exterior of the casing and includes an off position and a plurality of control positions respectively corresponding to the thermostatic switches, and a plurality of circuits that commonly include the selector switch and respectively include the thermostatic switches for selectively energizing the heating unit, wherein operation of the selector switch into its off position interrupts each of the circuits and operation of the selector switch into any one of its control positions prepares the corresponding one of the circuits and includes in series relation therein the corresponding one of the thermostatic switches.

A further object of the invention is to provide an improved wiring device for a room, or the like, comprising a hollow casing accommodating the circulation of air therethrough and housing both a plurality of thermostatic switches and a multi-position selector switch, wherein the thermostatic switches are progressively set to respond to progressive temperatures in the general range extending from about 55° F. to about 85° F. and the selector switch includes an off position and a plurality of control positions respectively corresponding to the thermostatic switches, and a plurality of circuit paths arranged between two buses that commonly include the selector switch and respectively include the thermostatic switches, wherein the selector switch in its off position interrupts each of the circuit paths and in each one of its control positions prepares the corresponding one of the circuit paths to the corresponding one of the thermostatic switches.

A still further object of the invention is to provide in a wiring device of the character described, an improved arrangement of the casing thereof to facilitate installation of the device and wiring of the associated electric circuits in a ready and simple manner and to accommodate ready inspection and repair of the elements of the electric circuits after installation and wiring of the device.

Further features of the invention pertain to the particular arrangement of the elements of the electric heating system and of the wiring device, whereby the above-outlined and additional operating features thereof are attained.

The invention, both as to its organization and method of operation, together with further objects and advantages thereof, will best be understood by reference to the following specification taken in connection with the accompanying drawings, in which:

FIGURE 1 is a fragmentary front perspective view of the corner of a room provided with a baseboard electric heating system incorporating a wiring device and embodying the present invention;

FIGS. 2 to 5, inclusive, are diagrammatic illustrations of the fundamental elements incorporated in the wiring device and respectively illustrating the selector switch thereof in its respective off, high, normal, and low positions;

FIG. 6 is an enlarged fragmentary front view, partly broken away of the one of the baseboard heating units, as shown in FIG. 1;

FIG. 7 is an enlarged lateral sectional view of the baseboard heating unit, taken in the direction of the arrows along the line 7—7 in FIG. 6;

FIG. 8 is an enlarged front view, partly broken away, of the wiring device, as shown in FIG. 1; and FIG. 9 is an enlarged lateral sectional view of the wiring device taken in the direction of the arrows along the line 9—9 in FIG. 8.

Referring now to FIG. 1 of the drawings, there is illustrated a corner of a room provided with a floor 11 and two upstanding side walls 12 and 13, and incorporating a baseboard electric heating system embodying the features of the present invention, and comprising, as shown, a baseboard heating unit 21 disposed along the lower portion of the upstanding room wall 12 and supported upon the adjacent portion of the floor 11, a baseboard heating unit 22 disposed along the lower portion of the upstanding room wall 13 and supported upon the adjacent portion of the floor 11, a baseboard wiring device 23 disposed along the lower portion of the upstanding room wall 12 and supported upon the adjacent portion of the floor 11, and a baseboard corner unit 24 disposed along the lower portions of both of the upstanding room walls 12 and 13 at the junction therebetween and supported upon the adjacent portion of the floor 11. Accordingly, the baseboard assembly, as illustrated, is substantially L-shaped and comprises the elements 21, 23, 24 and 22 arranged in series relation in the order named from left to right. In the arrangement, the baseboard heating units 21 and 22 may be substantially identical; and for purposes of illustration, the left hand end of the heating unit 21 is shown in open condition, while the right hand end of the heating unit 22 is shown as carrying an end cap 25 closing the same. Of course, it will be understood that the left hand end of the heating unit 21 will be either closed by an associated end cap, not shown, or will be connected to the adjacent end of still another heating unit, not shown. Also for purposes of illustration, the heating unit 21 is shown as being longer than the heating unit 22, since it is contemplated that these heating units will be manufactured in different standard lengths, as required.

The baseboard wiring device 23 comprises a control center for selectively governing the energization of the heating elements incorporated in the heating units 21 and 22, as explained more fully hereinafter; while the baseboard corner unit 24 fundamentally comprises a transition section in the baseboard structure between the wiring device 23 and the heating unit 22. Moreover, in the arrangement: the adjacent ends of the elements 21 and 23 are joined together by a suitable connector, not shown, employing screws as indicated at 26; the adjacent ends of the elements 23 and 24 are joined together by a suitable connector, not shown, employing screws as indicated at 27; and the adjacent ends of the elements 24 and 22 are joined together by a suitable connector, not shown, employing screws as indicated at 28. In the arrangement of the baseboard structure, each of the elements 21, 22, 23 and 24 is provided with substantially the same predetermined lateral cross section, so as to present a continuous unbroken appearance in the room, and without reference to the location and interposition of the wiring device 23 and heating units 21 and 22 in the baseboard structure.

Referring now to FIGS. 6 and 7, the baseboard heating unit 21 there illustrated essentially comprises an elongated casing including complementary rear and front sections 31 and 41 detachably secured together. The rear casing section 31 may be formed essentially of sheet metal and includes a substantially horizontally disposed bottom wall 32 that is adapted to engage the room floor 11, as shown in FIG. 1, and a substantially vertically disposed rear wall 33 that is adapted to be secured in place upon the lower portion of the upstanding room wall 12, as shown in FIG. 1. Also the rear casing section 31 includes an upwardly and rearwardly inclined wall 34 extending between the front portion of the bottom wall 32 and the lower portion of the rear wall 33 and cooperating therewith to define a wiring channel 35 in the lower or base portion of the rear casing section 31 that is adapted to receive electric cables, indicated at 36, that are employed in wiring the heating unit 21 to the wiring device 23 to form a unified electric heating system. In the upwardly inclined wall 34 suitable knock-outs 37 are provided in order to facilitate the required connections between the electric cables 36 and the heating element that is housed in the heating unit 21, as explained more fully hereinafter. Similarly, the front casing section 41 may be formed essentially of sheet metal and includes a substantially horizontally disposed top wall 42 and a generally vertically disposed front wall 43. The extreme rear portion of the top wall 42 is provided with a downwardly turned portion 42a that is adapted to be received behind a forwardly and upwardly directed ledge 33a carried on the extreme top of the rear wall 33. The front wall 43 includes a lower substantially vertical portion 43a and a rearwardly and upwardly inclined upper portion 43b joining the front of the top wall 42. The extreme lower end of the lower portion 43a of the front wall 43 is provided with a forwardly and downwardly directed ledge 44 disposed above the upwardly inclined wall 34 and cooperating therewith to define an elongated air inlet passage 45 into the casing of the heating unit 21; and the upper portion 43b of the front wall 43 has a number of longitudinally spaced-apart holes or windows 46 formed therein to define air outlet passages from the casing of the heating unit 21. As previously noted, the right hand end of the casing of the heating unit 21 is secured to the adjacent left hand end of the wiring device 23; and for the purpose of completing this assembly, there is provided the previously mentioned connector, indicated at 50, the connector 50 being of strap-like structure and having an inverted substantially J-shaped configuration conforming to the adjacent ends of the elements 21 and 23 and being secured in place in bridging relation interiorly thereof by the previously mentioned screws 26, as shown in FIG. 1; which screws extend through cooperating threaded openings 51 provided in the connector 50.

Further the heating unit 21 comprises a pair of longitudinally spaced-apart and forwardly directed brackets 52 secured to the rear wall 33 and provided with aligned notches 52a therein that are adapted removably to receive the opposite ends of an elongated heating element 61 that is preferably of the sheathed resistance conductor type. As illustrated, the heating element 61 includes an enclosing tubular metallic sheath 62 and a resistance conductor 63, as well as an embedded layer 64 of electrical-insulating and heat-conducting material, such as MgO. Further the tubular metallic sheath 62 of the heating element 61 carries a body 65 of refractory material, such as MgO, that may have a lateral cross section that is substantially H-shaped, as illustrated. In the arrangement, the heating element 61 extends through a cooperating longitudinally extending opening provided through the refractory body 65 for the supporting purpose, whereby the refractory body 65 is arranged in good heat exchange relation with the metallic sheath 62. In the construction, the refractory body 65 lends substantial thermal mass to the heating element 61 and serves the fundamental purpose of heating the room air that is circulated through the heating unit 21. More particularly, the room air is circulated into the air inlet passage 45 and over the hot refractory body 65 and then out of the holes or windows 46, whereby the same is heated for the room-heating purpose, the air being circulated through the casing of the heating unit 21 fundamentally by convection currents by the bottom location of the opening 45 and the top location of the holes 46, together with the central location of the hot refractory body 65.

The opposite ends of the heating elements 61 are provided with terminals, not shown, to which suitable connectors 66 are secured for the purpose of completing the required electric circuits and involving the electric cables 36, as well as the wiring device 23, as explained more fully hereinafter. Also a suitable convenience electrical outlet 67 may be provided in one or both ends of the top wall 42 of the front casing section 41 and suitably wired to the electric cables 36 in an obvious manner.

Referring now to FIGS. 8 and 9, the baseboard wiring device 23 there illustrated and embodying the features of the present invention essentially comprises an elongated casing including complementary rear and front sections 71 and 81 detachably secured together. The rear casing section 71 may be formed essentially of sheet metal and includes a substantially horizontally disposed bottom wall 72 that is adapted to engage the room floor 11, as shown in FIG. 1, and a substantially vertically disposed rear wall 73 that is adapted to be secured in place upon the lower portion of the upstanding room wall 12, as shown in FIG. 1. Also the rear casing section 71 includes an upwardly and rearwardly inclined wall 74 extending between the front portion of the bottom wall 72 and the lower portion of the rear wall 73 and cooperating therewith to define a wiring channel 75 in the lower or base portion of the rear casing section 71 that is adapted to receive the electric cables 36, that are employing in wiring the wiring device 23 to the heating units 21 and 22 to form a unified electric heating system. In the upwardly inclined wall 74 suitable knock-outs 77 are provided in order to facilitate the required connections between the electric cables 36 and the apparatus housed in the casing of the wiring device 23, as explained more fully hereinafter. Similarly, the front casing section 81 may be formed essentially of sheet metal and includes a substantially horizontally disposed top wall 82 and a generally vertically disposed front wall 83. The extreme rear portion of the top wall 82 is provided with a downwardly turned portion 82a that is adapted to be received behind a forwardly and upwardly directed ledge 73a carried on the extreme top of the rear wall 73. The front wall 83 includes a lower substantially vertical portion 83a and a rearwardly and upwardly inclined upper portion 83b joining the front of the top wall 82. The extreme lower end of the lower portion 83a of the front wall 83 is provided with a forwardly and downwardly directed ledge 84 disposed above the upwardly inclined wall 74 and cooperating therewith to define an elongated air inlet passage 85 into the casing of the wiring device 23; and the upper portion 83b of the front wall 83 has a number of longitudinally spaced-apart holes or windows 86 formed therein to define air outlet passages from the casing of the wiring device 23. As previously noted, the left-hand end of the casing of the wiring device 23 is secured to the adjacent right-hand end of the heating unit 21; and for the purpose of completing this assembly, a connector, similar to the connector 50, may be employed.

Also a centrally disposed opening 83c is formed in the lower portion 83a of the front wall 83; which opening 83c is closed by a substantially cup-shaped wall 87 carried by the rear surface of the front wall 83 and arranged interiorly of the casing of the wiring device 23. More particularly, the cup-shaped wall 87 is disposed well forwardly of the rear wall 73 and well above the upwardly inclined wall 74 and defines a hollow pocket 87a therein that is readily accessible from the exterior through the opening 83c formed in the front wall 83.

Also the rear casing section 71 is provided with end walls 78 joining the bottom wall 72 and the rear wall 73 and cooperating with the removable front casing section 81 to support the same in cooperative relation with the rear casing section 71. Each of the end walls 78 is provided with a knock-out 79 therein communicating with the wiring channel 75 so as to accommodate the passage therethrough of the electric cables 36.

Further the casing of the wiring device 23 houses a manually operable multi-position selector switch 91 of the pushbutton type; which selector switch 91 is preferably of the construction of that disclosed in U.S. Patent No. 2,437,555, that was granted on March 9, 1948 to Gregory L. Rees. More particularly, the selector switch 91 comprises a base 92 that is directly secured to the upper surface of the upwardly inclined wall 74 forming a part of the rear casing section 71, as well as four individual pushbuttons 101, 102, 103 and 104 projecting through four corresponding holes provided in the lower portion of the cup-shaped wall 87 and terminating in the pocket 87a, when the front casing section 81 occupies its normal assembled relation with respect to the rear casing section 71. In the arrangement: the pushbutton 101 comprises an "off" pushbutton; the pushbutton 102 comprises a "high" pushbutton; the pushbutton 103 comprises a "normal" or "medium" pushbutton; and the pushbutton 104 comprises a "low" pushbutton. Of course, the selector switch 91 comprises switching mechanism that is selectively operated by the pushbuttons 101 to 104, inclusive, into the corresponding switching positions, as explained more fully hereinafter, as well as interlock mechanism that accommodates operation of only one of the pushbuttons at any given time, the interlock mechanism also responding to the operation or depression of any one of the pushbuttons to effect the return into its restored or projected position of the last previously operated one of the pushbuttons. Further, the selector switch 91 comprises selectively operative signal and illuminating mechanism that includes an associated electric lamp 105 and a cooperating lamp hood 106; all as disclosed in the Rees patent. More particularly, when the "off" pushbutton 101 is operated, the electric lamp 105 is extinguished, and when any one of the pushbuttons 102, 103 and 104 is operated, the electric lamp 105 is illuminated; and moreover, the color signal mechanism is selectively actuated so that the operated one of the pushbuttons 102, 103 or 104 is illuminated with a corresponding and distinct color, thereby presenting a color signal correlated with the operated position of the corresponding pushbutton 102, 103 or 104.

Further, the casing of the wiring device 23 houses a plurality of individual thermostatic switches 112, 113 and 114 respectively corresponding to the individual pushbuttons 102, 103 and 104 of the selector switch 91; which thermostatic switches 112, 113 and 114 are directly mounted upon the upper surface of the upwardly inclined wall 74 forming a part of the rear casing section 71. More particularly, an elongated insulator 115 is directly secured to the upper surface of the upwardly inclined wall 74 adjacent to the right-hand side thereof and to the right of the selector switch 91, as viewed in FIG. 8; and the thermostatic switches 112, 113 and 114 are directly secured to the insulator 115 in longitudinally spaced-apart upstanding positions. The particular construction and arrangement of the thermostatic switches 112, 113 and 114 is not critical, and they have been shown, for purposes of illustration, as being of the bimetallic element type. Accordingly, each of the thermostatic switches 112, 113 and 114 essentially comprises a bimetallic bar or thermal-responsive element and a cooperating contact fixture, as well as a pair of circuit-controlling contacts respectively carried by the free end of the bimetallic bar and by the contact fixture. For example, the thermostatic switch 114 comprises the bimetallic bar illustrated, and the associated contact fixture 116, as well as the two circuit-controlling contacts respectively carried by the free end of the bimetallic bar and by the contact fixture 116.

As previously noted the thermostatic switches 112, 113 and 114 respectively correspond to the individual pushbuttons 102, 103 and 104 of the selector switch 91; whereby the thermostatic switch 112 comprises a "high" temperature circuit controller, the thermostatic switch 113 comprises a "normal" or "medium" temperature circuit controller and the thermostatic switch 114 comprises a "low" temperature circuit controller. More particularly, the three thermal bars of the respective thermostatic switches 112, 113 and 114 are progressively fixedly set to respond to corresponding progressive temperatures in the general temperature range extending from about 55° F. to about 85° F. Specifically, the thermal bar of the thermostatic switch 112 may be set for control in the relatively high temperature range embracing the temperatures from about 75° F. to about 85° F., the thermal bar effecting closing of the associated contacts at temperatures disposed below about 75° F. and effecting opening of the associated contacts at temperatures disposed above about 85° F. Similarly, the thermal bar of the thermostatic switch 113 may be set for control in the relatively normal or medium temperature range embracing the temperatures from about 68° F. to about 74° F., the thermal bar effecting closing of the associated contacts at temperatures disposed below about 68° F. and effecting opening of the associated contacts at temperatures disposed above about 74° F. Similarly, the thermal bar of the thermostatic switch 114 may be set for control in the relatively low temperature range embracing the temperatures from about 55° F. to about 65° F., the thermal bar effecting closing of the associated contacts at temperatures disposed below about 55° F. and effecting opening of the associated contacts at temperatures disposed above about 65° F.

In the arrangement of the wiring device 23 the room air is circulated into the lower air inlet passage 85 and thence upwardly through the casing thereof and out of the upper air outlet openings 86 back into the room; whereby the air circulated through the casing of the wiring device 23 governs the three thermostatic switches 112, 113 and 114, the thermal bars of which are arranged in this air stream; whereby the thermostatic switches 112, 113 and 114 are selectively operated into their opened and closed positions in response to the temperature of the air circulated through the casing of the wiring device 23 for a purpose more fully explained hereinafter.

Also a suitable convenience electrical outlet 117 may be provided in the central portion of the top wall 82 of the front casing section 81 of the wiring device 23 and suitably wired to the electric cables 36 in an obvious manner.

The mode of operation and circuit arrangement of the apparatus housed in the casing of the wiring device 23 in conjunction with the other components of the electric heating system will best be understood by reference to FIGS. 2, 3, 4 and 5, wherein the selector switch 91 is respectively shown in its off, high, normal and low positions. As illustrated, the electric heating system comprises a source of electric power supply of the 3-wire Edison type, including a grounded neutral conductor N and two outside ungrounded conductors L1 and L2, the system being of the conventional 236 volts, single-phase, A.-C. type. The selector switch 91 is provided with five incoming terminals 120, 121, 122, 123 and 124 that are respectively connected to the neutral conductor N, to the line conductor L1, to the line conductor L2, to the line conductor L2, and to the line conductor L2, as well as four outgoing terminals 131, 132, 133 and 134 that are respectively connected to a conductor 140, to the thermostatic switch 112, to the thermostatic switch 113, and to the thermostatic switch 114. In the arrangement: the electric lamp 105, forming a part of the illuminating and color control mechanism of the selector switch 91, is connected between the neutral conductor N and the conductor 140; and also a signal lamp of the glow discharge type 141 is provided that is also connected in parallel with the electric lamp 105. The signal lamp 141 is also housed within the casing of the wiring device 23 and projects through a cooperating hole provided in the lower portion of the cup-shaped wall 87 into the pocket 87a adjacent to the "off" pushbutton 101. The signal lamp 141 may conveniently comprise a neon lamp, whereby the same glows with a distinct red color when any one of the pushbuttons 102, 103 or 104 occupies its operated position.

As illustrated in FIGS. 2, 3, 4 and 5, two of the electric heating elements 63 and 63a respectively incorporated in the heating units 21 and 22 are connected in parallel relation between the conductor 140 and a bus 142; and also the bus 142 is wired to the stationary contacts of the contact pairs respectively controlled by the thermostatic switches 112, 113 and 114.

Now, as illustrated in FIG. 2, when the "off" pushbutton 101 of the selector switch 91 is operated, all of the connections between the incoming terminals and the outgoing terminals are interrupted, whereby both of the lamps 105 and 141 are extinguished and the electric heating elements 63 and 63a are deenergized.

As illustrated in FIG. 3, when the high pushbutton 102 of the selector switch 91 is operated, two switch blades 151 and 152 forming a part of the switching mechanism incorporated in the selector switch 91 respectively connect the two incoming terminals 121 and 122 to the two outgoing terminals 131 and 132 thereby to illuminate the two lamps 105 and 141 and to effect the selection of the corresponding "high" thermostatic switch 112. The illumination of the signal lamp 141 indicates that one of the pushbuttons, other than the "off" pushbutton 101, of the selector switch 91 occupies its operated position; while the illumination of the electric lamp 105 effects illumination of the operated "high" pushbutton 102 in its corresponding distinctive color. Further, at this time the two heating elements 63 and 63a are encircuited in parallel relation with each other and in series relation with the "high" thermostat 112 across the line conductors L1 and L2; whereby the heating elements 63 and 63a are either energized or deenergized depending upon the corresponding positions of the selected "high" thermostatic switch 112. More particularly, when the thermal bar of the thermostatic switch 112 is cold the associated contacts are closed effecting energization of the heating elements 63 and 63a in parallel relation. Of course, the heating elements 63 and 63a develop thermal heat; whereby the heating units 21 and 22 effect heating of the room, with the result that the temperature of the room air that is circulated through the casing of the wiring device 23 is increased as time proceeds; whereby ultimately the temperature of the room air reaches the control temperature required to effect operation of the selected "high" thermostatic switch 112 into its open position, so as to interrupt the circuits for energizing the heating elements 63 and 63a. Accordingly, the selected "high" thermostatic switch 112 selectively controls the energization of the heating elements 63 and 63a so as to maintain a relatively high temperature of the room air and in the previously mentioned "high" temperature range extending from about 75° F. to about 85° F.

As shown in FIG. 4 operation of the normal pushbutton 103 of the selector switch 91 effects closure of the two switch blades 151 and 153 so as to connect the two incoming terminals 121 and 123 respectively to the two outgoing terminals 131 and 133, with the result that the "medium" or "normal" thermostatic switch 113 is selected for the control purpose so as to govern the energization of the heating elements 63 and 63a in order to maintain the temperature of the room air in the "medium" temperature range extending from about 68° F. to about 74° F.

As shown in FIG. 5 operation of the "low" pushbutton 104 of the selector switch 91 effects closure of the two switch blades 151 and 154 so as to connect the two incoming terminals 121 and 124 respectively to the two outgoing terminals 131 and 134, with the result that the "low" thermostatic switch 114 is selected for the control purpose so as to govern the energization of the heating elements 63 and 63a in order to maintain the temperature of the room air in the "low" temperature range extending from about 55° F. to about 65° F.

In view of the foregoing description of the mode of operation of the selector switch 91 in conjunction with FIGS. 2, 3, 4 and 5, it will be understood that the desired temperature range of the room air may be readily preselected merely by operation of the corresponding one of the pushbuttons 102, 103 and 104, so as to bring about the selection for the control purpose of the corresponding one of the thermostatic switches 112, 113 or 114, and of course, operation of the electric heating system is terminated by operation of the "off" pushbutton 101 of the selector switch 91. Moreover, the arrangement of three of the thermostatic switches 112, 113 and 114 in the wiring device 23, has been made only for purpose of illustration, as the actual number of such thermostatic switches employed is in no way critical; and in this connection, it is noted that the pushbutton switch 91 may be readily manufactured including any reasonable number of control pushbuttons. Furthermore, the selected temperature range extending from about 55° F. to about 85° F. is not critical, and may be appropriately selected, as desired.

As previously noted, the thermostatic switches 112, etc., may be of any suitable type, including the bimetallic element type illustrated, the conventional fluid bulb and bellows type, etc.; and similarly, the switching contacts controlled by each of these thermostatic switches may be of any suitable type; and finally, each of these thermostatic switches may comprise conventional snap-acting opening-closing mechanism, if desired.

Furthermore, it is pointed out that in the baseboard electric heating system, all of the heating units 21, 22, etc., arranged in the composite baseboard structure in the room illustrated, may be governed by a single one of the wiring devices 23, or each of the heating units may be individually controlled by a corresponding one of the wiring devices individually associated therewith, or the heating units may be arranged in a number of appropriate groups that are respectively controlled by a corresponding number of the wiring devices.

In view of the foregoing, it is apparent that there has been provided an improved baseboard electric heating system and wiring device therefor that are of simple and economical construction and arrangement and that may be readily installed in an existing room in a simple manner without modification of the walls of the room. Also, in the construction of a new house, the electric wiring is greatly simplified, since the installation of the baseboard electric heating system may take place largely following the plastering of the room walls, and with the required electrical outlets and notwithstanding the prior plastering of the room walls. Moreover, the provision of the fixed thermostatic switches in the wiring device, forming a part of the baseboard structure, together with the associated manually operable selector switch, provides an economical temperature control arrangement that is entirely satisfactory for the present purpose.

While there has been described what is at present considered to be the preferred embodiment of the invention, it will be understood that various modifications may be made therein, and it is intended to cover in the appended claim all such modifications as fall within the true spirit and scope of the invention.

What is claimed is:

A baseboard wiring device for a room, or the like, comprising a hollow casing including complementary rear and front sections, said rear casing section including a substantially horizontally disposed bottom wall adapted to engage the room floor and a substantially vertically disposed rear wall adapted to be secured in place upon the lower portion of the room wall adjacent to the room floor, said rear casing section also including an upwardly inclined wall extending between the front portion of said bottom wall and the lower portion of said rear wall and defining a wiring channel therebelow, said front casing section including front and top walls respectively disposed forwardly and above said rear and bottom walls, the rear portion of said top wall engaging the upper portion of said rear wall to close the top of said casing and the lower portion of said front wall being spaced above said bottom wall to provide a room air inlet into the bottom front of said casing and the upper portion of said front wall having holes therein to provide a room air outlet from the top front of said casing, whereby a current of room air may be circulated through said casing and across the upper side of said upwardly inclined wall, a plurality of thermostatic switches mounted upon the upper side of said upwardly inclined wall and housed in said casing and exposed to the current of room air circulated therethrough and responsive to the temperature thereof, said thermostatic switches being progressively set to respond to progressive temperatures in the general range extending from about 55° F. to about 85° F., a multi-position selector switch mounted upon the upper side of said upwardly inclined wall and housed in said casing and including an off position and a plurality of control positions respectively corresponding to said thermostatic switches, said selector switch being of the pushbutton type including an off position corresponding to the off position thereof and a plurality of control pushbuttons respectively corresponding to the control positions thereof, said pushbuttons projecting from said casing through opening facility provided in said front wall and accessible from the exterior so as to accommodate ready selective operation thereby of said selector switch, two buses, and a plurality of circuit paths between said two buses commonly including said selector switch and respectively including said thermostatic switches, said selector switch in its off position interrupting each of said circuit paths and in each one of its control positions preparing the corresponding one of said circuit paths to the corresponding one of said thermostatic switches, each one of said thermostatic switches in its open position interrupting the corresponding one of said prepared circuit paths and in its closed position completing the corresponding one of said prepared circuit paths.

References Cited in the file of this patent
UNITED STATES PATENTS

| | | |
|---|---|---|
| Re. 14,286 | Mann | Apr. 17, 1917 |
| 1,664,171 | Hicks | Mar. 27, 1928 |
| 2,180,643 | Mullin | Nov. 21, 1939 |
| 2,251,556 | Siegler | Aug. 5, 1941 |
| 2,437,555 | Rees | Mar. 9, 1948 |
| 2,716,683 | Kathe | Aug. 30, 1955 |
| 2,724,765 | Braxter | Nov. 22, 1955 |
| 2,731,242 | Borg et al. | Jan. 17, 1956 |
| 2,799,763 | Hicks | July 16, 1957 |